United States Patent
Park et al.

(10) Patent No.: US 12,003,912 B2
(45) Date of Patent: Jun. 4, 2024

(54) METHOD FOR CONTROLLING ELECTRONIC DEVICES BASED ON BATTERY RESIDUAL CAPACITY AND ELECTRONIC DEVICE THEREFOR

(71) Applicant: Samsung Electronics Co., Ltd., Gyeonggi-do (KR)

(72) Inventors: Namjoon Park, Gyeonggi-do (KR); Jinik Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 17/585,859

(22) Filed: Jan. 27, 2022

(65) Prior Publication Data
US 2022/0225009 A1    Jul. 14, 2022

Related U.S. Application Data

(63) Continuation of application No. PCT/KR2022/000066, filed on Jan. 4, 2022.

(30) Foreign Application Priority Data

Jan. 13, 2021   (KR) .................. 10-2021-0004812

(51) Int. Cl.
*H04R 1/10* (2006.01)
*G01C 19/04* (2006.01)
(Continued)

(52) U.S. Cl.
CPC .......... *H04R 1/1041* (2013.01); *G01C 19/04* (2013.01); *H04R 1/10* (2013.01); *H04R 1/1016* (2013.01);
(Continued)

(58) Field of Classification Search
CPC ...... H04R 1/10; H04R 1/1016; H04R 1/1041; H04R 5/033; H04R 5/04; H04R 2460/03; G06F 1/3212
See application file for complete search history.

(56) References Cited

U.S. PATENT DOCUMENTS 9,386,391 B2   7/2016  Madhu
10,244,468 B2  3/2019  Newham
(Continued)

FOREIGN PATENT DOCUMENTS

CN   106937197 A   7/2017
CN   111510810 A   8/2020
(Continued)

OTHER PUBLICATIONS

International Search Report dated Apr. 12, 2022.
Written Opinion dated Apr. 12, 2022.
European Search Report dated Feb. 2, 2024.

*Primary Examiner* — Huyen D Le
(74) *Attorney, Agent, or Firm* — Cha & Reiter, LLC

(57) ABSTRACT

An electronic device comprises: a memory; a battery; a speaker; a sensor module; a communication module; and a processor electrically connected to the memory, the battery, the speaker, the sensor module, and the communication module, wherein the processor is configured to: control the communication module to establish a first communication link with a sound source electronic device and transmit a first posture value calculated based on a sensor value obtained from the sensor module over the first communication link, receive audio data rendered based on the posture value from the sound source electronic device, communicate, based on device state information of the electronic device, with an external electronic device through a second communication link so as to request a role switching preparation, and transmit a role switching message to the external
(Continued)

electronic device and notify the sound source electronic device of role switching with the external electronic device, wherein after role switching, the electronic device transmits the first posture value to the external electronic device.

20 Claims, 9 Drawing Sheets

(51) Int. Cl.
  *H04R 3/00* (2006.01)
  *H04R 5/033* (2006.01)
  *H04R 5/04* (2006.01)
(52) U.S. Cl.
  CPC ............... *H04R 3/00* (2013.01); *H04R 5/033* (2013.01); *H04R 5/04* (2013.01); *H04R 2460/03* (2013.01)

(56) References Cited

U.S. PATENT DOCUMENTS

| | | | |
|---|---|---|---|
| 10,291,975 | B2 | 5/2019 | Howell et al. |
| 10,735,845 | B2 | 8/2020 | Lee et al. |
| 2017/0264987 | A1 | 9/2017 | Hong et al. |
| 2018/0091922 | A1 | 3/2018 | Satongar et al. |
| 2018/0199282 | A1* | 7/2018 | Newham ........... H04W 52/0206 |
| 2019/0357000 | A1 | 11/2019 | Karkkainen et al. |
| 2020/0007977 | A1 | 1/2020 | Gong et al. |
| 2020/0252993 | A1 | 8/2020 | Srivastava et al. |
| 2022/0124425 | A1* | 4/2022 | Jo ........................ H04B 1/3827 |

FOREIGN PATENT DOCUMENTS

| | | | |
|---|---|---|---|
| KR | 10-2019-0025495 A | 3/2019 |
| KR | 10-2101115 B1 | 4/2020 |
| KR | 10-2102604 B1 | 4/2020 |
| WO | 2018/026201 A1 | 2/2018 |

\* cited by examiner

[410]　　　　　　　[420]　　　　　　　[430]

METHOD FOR CONTROLLING ELECTRONIC DEVICES BASED ON BATTERY RESIDUAL CAPACITY AND ELECTRONIC DEVICE THEREFOR

CROSS-REFERENCE TO RELATED APPLICATION(S)

This application is a continuation of International Application No. PCT/KR2022/000066, filed on Jan. 4, 2022, which claims priority to Korean Patent Application No. 10-2021-0004812, filed on Jan. 13, 2021 in the Korean Intellectual Property Office, the disclosures of which are herein incorporated by reference.

TECHNICAL FIELD

Certain embodiments disclosed herein relate to a method for controlling electronic devices, based on the battery's residual capacity, and an electronic device therefor.

BACKGROUND ART

Electronic devices, such as earphones, include speakers and microphones, and are thus capable of outputting audio data including music or a voice via the speakers, and acquiring audio data via the microphones. Recently, earphones have developed to include various sensors, communication modules, and processors in addition to speakers and microphones. These earphones can transmit or receive various data, or receive and output audio data by being connected, via a short-range wireless technology such as Bluetooth, to various types of external electronic devices (or sound source electronic devices), for example, a mobile communication terminal, a personal digital assistant (PDA), an electronic organizer, a smartphone, a tablet personal computer (PC), and a wearable device.

An earphone may detect the user's posture/body position and calculate a posture value to determine how to render audio data. The earphone detects the user's posture by using sensors. Thus, based on the sensor values, the earphone determines the posture value of the user's posture. The ear phone may output audio data rendered with respect to the user's posture.

Where there are multiple earphones, one earphone can calculate a posture value and transmit the same to a sound source or electronic device providing the sound source. However, detecting the user's posture may result in heave battery consumption. This can lead to a situation where the earphone that calculates the posture value has insufficient battery power. Moreover, this can occur, while the other earphone(s) have sufficient battery power.

SUMMARY

An electronic device comprises: a memory; a battery; a speaker; a sensor module; a communication module; and a processor electrically connected to the memory, the battery, the speaker, the sensor module, and the communication module, wherein the processor is configured to: control the communication module to establish a first communication link with a sound source electronic device and transmit a first posture value calculated based on a sensor value obtained from the sensor module over the first communication link, receive audio data rendered based on the posture value from the sound source electronic device, communicate, based on device state information of the electronic device, with an external electronic device through a second communication link so as to request a role switching preparation, and transmit a role switching message to the external electronic device and notify the sound source electronic device of role switching with the external electronic device.

A method for an electronic device comprising a sensor module, comprises: establishing a first communication link with a sound source electronic device and transmitting to the sound source electronic device, a first posture value calculated based on a sensor value obtained from the sensor module; receiving audio data rendered based on the posture value from the sound source electronic device; communicating, based on device state information, with an external electronic device, through a second communication link so as to request a role switching preparation; transmitting a role switching message to the external electronic device; and notifying the sound source electronic device of role switching with the external electronic device.

An electronic device comprises: a memory; a communication module; and a processor electrically connected to the memory and the communication module, wherein the processor is configured to: control the communication module to establish a first communication link with a first electronic device and receive a posture value of the first electronic device that performs a primary role, transmit audio data rendered based on the posture value to the first electronic device, receive a posture value of a second electronic device after receiving notification of role switching from the first electronic device, and transmit audio data rendered based on the posture value from the second electronic device to at least one of the first electronic device or the second electronic device.

Certain embodiments disclosed herein are to provide a method for controlling electronic devices, based on a battery residual capacity, and an electronic device therefor.

The technical task to be achieved by the disclosure is not limited to that mentioned above, and other technical tasks that are not mentioned above may be clearly understood to those skilled in the art based on the description provided below.

The operation of multiple electronic devices can be controlled based on battery residual capacity information.

The role of an electronic device, among multiple electronic devices, which calculates a posture value and transmits the same to a sound source electronic device can be switched based on battery residual capacity information.

The battery efficiency of multiple electronic devices can be increased by controlling the roles of the multiple electronic devices, based on battery residual capacity information.

Various other effects directly or indirectly recognized herein can also be provided.

BRIEF DESCRIPTION OF DRAWINGS

In relation to the description of drawings, the same or similar elements may be indicated by the same or similar reference signs.

DETAILED DESCRIPTION

In a 360-degree audio system, the earphones provide sound to left and right ears that simulate the sound that a person would hear if they were actually present when the recorded sound occurred. For example, if the user rotates 180 degrees, their left ear will be in approximately the same place that the right ear was previously in, and vice versa. In the 360-degree audio system, the sound that was previously heard in the right ear would now be heard in the left ear, and vice versa. This will be described in further detail in FIG. 4.

The term earphone call be understood to collectively refer to earbuds, headphones, and earphones.

Figure 1:
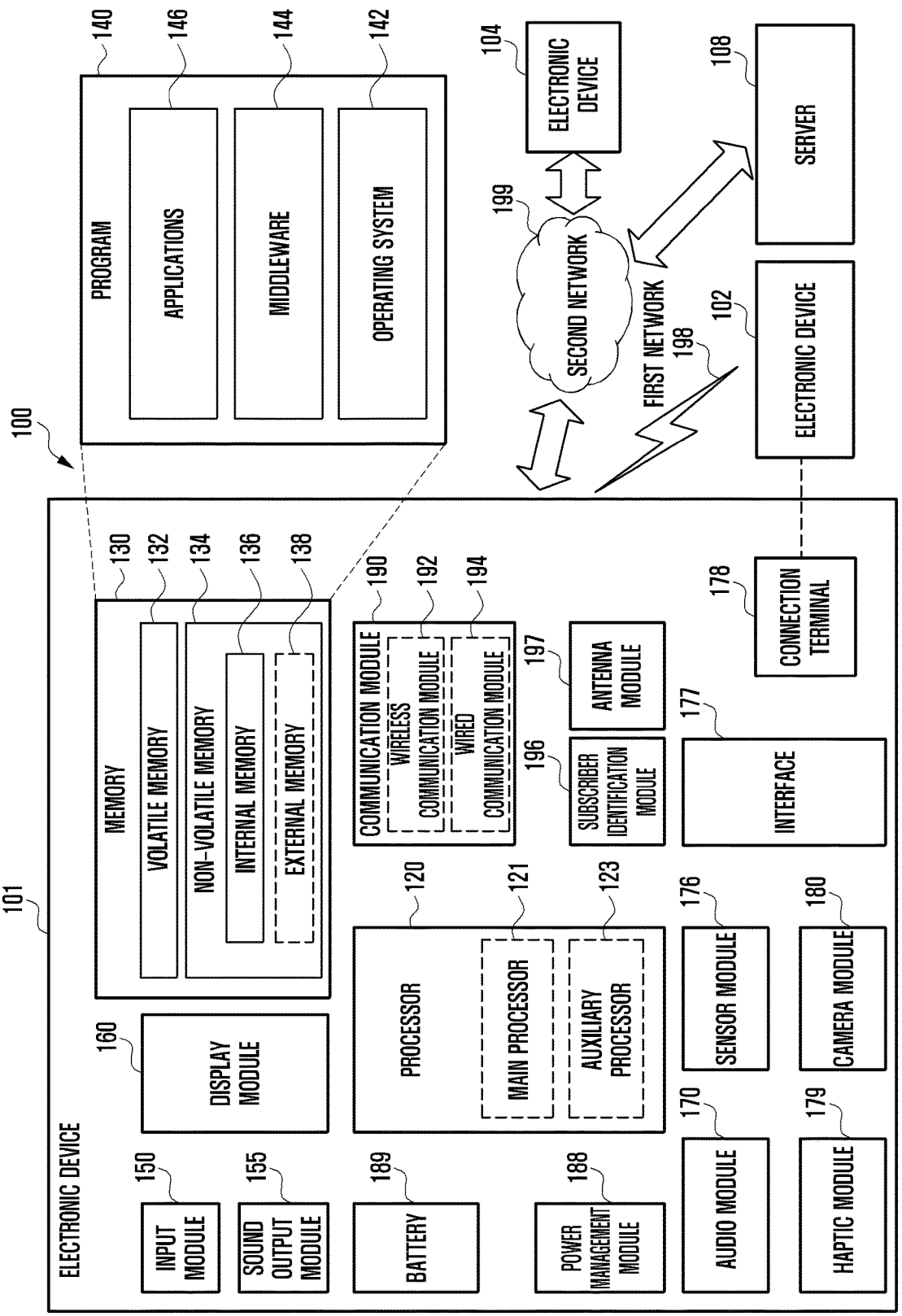
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123. The auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

The antenna module 197 may form a mmWave antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, The module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, The integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

A 360-degree audio system can include two or more earphones 210 and 220 that are electronic device 101, as well as an external electronic device 230. It is noted that the earphones 210 and 220 may omit certain features of the electronic device 101, such as, but not limited to the display module 160. The external electronic device 230 may also omit certain features.

Figure 2:
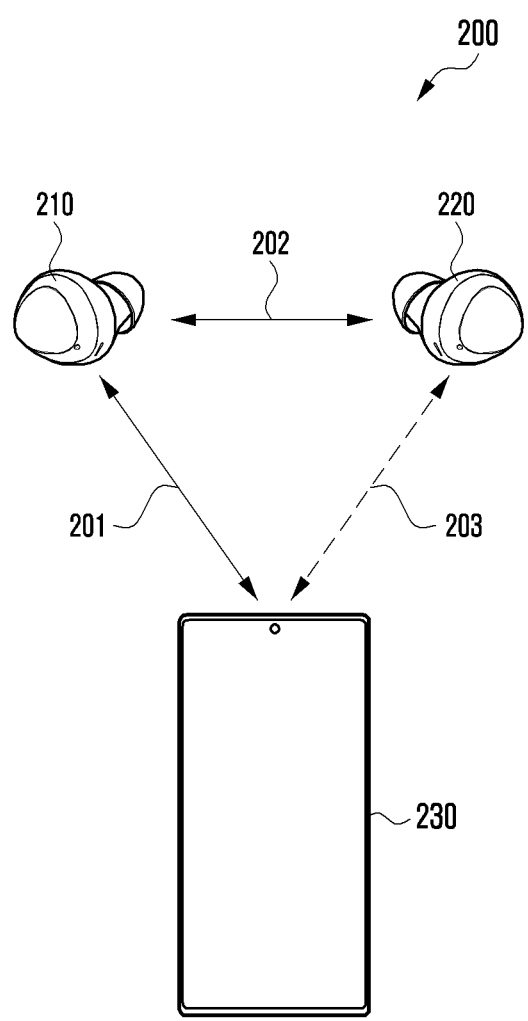
FIG. 2 is a configuration diagram of electronic devices and a sound source electronic device according to certain embodiments.

FIG. 2 is a configuration diagram 200 of electronic devices 210 and/or 220 (e.g., the electronic device 102 in FIG. 1) and a sound source electronic device 230 (e.g., the electronic device 101 in FIG. 1) according to certain embodiments.

Referring to FIG. 2, the electronic devices 210 and/or 220 may include a first electronic device 210 and/or a second electronic device 220. For example, the electronic devices 210 and/or 220 may be worn on a user, and may include headphones, earphones, and/or earbuds capable of providing a sound to the user, based on audio data received from the sound source electronic device 230 by using a communication function. Hereinafter, an example in which the first electronic device 210 and the second electronic device 220 included in the electronic devices 210 and/or 220 are implemented as earbuds, respectively, will be described, but certain embodiments may not be limited thereto.

For ease of understanding, electronic device 210 and 220 may also be referred to as earbuds with the understanding that this disclosure is not limited to earbuds, and further the earbuds are a type of electronic device.

The sound source electronic device 230 may be a portable and/or movable electronic device, such as a smartphone, a tablet PC, a portable multimedia player (PMP), a personal digital assistant (PDA), a laptop PC, and a wearable device.

The sound source electronic device 230 may be an electronic device capable of reproducing music or an image, and may provide relevant audio data to the electronic devices 210 and/or 220.

The electronic devices 210 and/or 220 may be connected to the sound source electronic device 230 by wireless communication. For example, the sound source electronic device 230 may communicate with the first electronic device 210 or the second electronic device 220 by using a first communication link 201 or a third communication link 203 (e.g., the first network 198 in FIG. 1) including a short-range communication network, such as Bluetooth (or BLE), WiFi direct, or infrared data association (IrDA).

The first electronic device 210 and the second electronic device 220 may communicate with each other by using a second communication link 202 (e.g., a short-range wireless communication network).

One of the electronic devices 210 and/or 220 may establish communication with the sound source electronic device 230 by performing the role of a primary device (e.g., the first electronic device 210). The other one (e.g., the second electronic device 220) of the electronic devices 210 and/or 220 may establish communication with the first electronic device 210, and perform the role of a secondary device. In a case where the first electronic device 210 and the second electronic device 220 are implemented as earbuds, the first electronic device 210 may be called a PE (a primary earbud or primary equipment), and the second electronic device 220 may be called an SE (a secondary earbud or secondary equipment). For example, the first electronic device 210 may communicate, as a primary device, with the sound source electronic device 230 through the first communication link 201, and the second electronic device 220 may communicate, as a secondary device, with the first electronic device 220 through the second communication link 202.

In this case, the third communication link 203 between the second electronic device 220 and the sound source electronic device 230 may be in an idle state and/or be in a non-connected state. For example, the second electronic device 220 may perform sniffing, as a secondary device, for the first communication link 201 between the first electronic device 210 and the sound source electronic device 230 to obtain data transmitted from the sound source electronic device 230 to the first electronic device 210.

Hereinafter, a case where the first electronic device 210 of the electronic devices 210 and/or 220 may be connected, as a primary device and early in the operation thereof, to the sound source electronic device 230 through the first communication link 201 by communication, and transmits or receives data thereto or therefrom, and the second electronic device 220 may perform sniffing for the first communication link 201 as a secondary device to obtain data may be described as an example. In this case, the third communication link 203 with the sound source electronic device 230 may be in an idle state and/or be in a non-connected state.

It is noted that the primary device may use more power than the secondary device. Accordingly, over time, the primary device may have considerably less battery power than the secondary device. The first electronic device 210 and the second earbud 220 can then perform role switching. This allows the earbud with more battery capacity to act as the primary earbud. Accordingly, the earbuds 210 and 220 can function for a longer time.

The first electronic device 210, which is a primary device, may perform role switching with the second electronic device 220, which is a secondary device, so that the second electronic device 220 operates, as a primary device, to connect to the sound source electronic device 230 through the third communication link 203, and communicate with same. For example, the first electronic device 210 may switch to the role of a secondary device, communicate with the second electronic device 220, which is a primary device, through the second communication link 202, and perform sniffing for the third communication link 203 to obtain data transmitted from the sound source electronic device 230 to the second electronic device 220. For example, the second electronic device 220 having switched to the role of a secondary device may switch the first communication link 201 with the sound source electronic device 230 to be in an idle state and/or a non-connected state.

When the first electronic device 210 obtains a sensor value and performs a posture value calculation operation based on the sensor value according to certain embodiments described later, the first electronic device may allow the second electronic device 220 to perform the posture value calculation operation via role switching with the second electronic device 220, and operate, in communication, as a primary device communicating with the sound source electronic device 230 while maintaining a state connected to the first communication link 201. For example, in a case where the battery residual capacity of the first electronic device 210 is high, but an abnormality of a sensor has occurred, the second electronic device 220 may be allowed to obtain a sensor value and perform a posture value calculation operation based on the sensor value.

Figure 3:
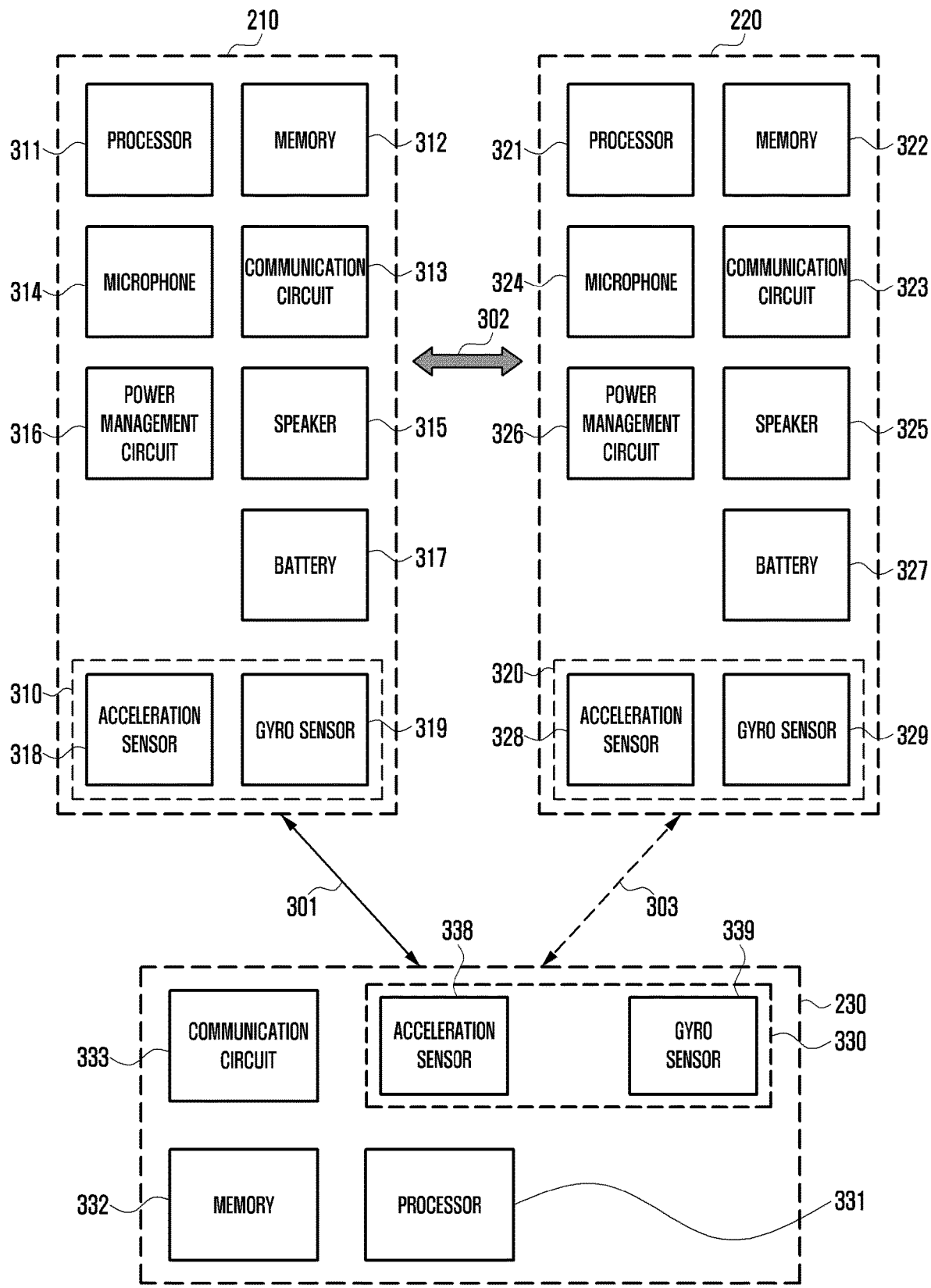
FIG. 3 is a block diagram of electronic devices according to certain embodiments.

FIG. 3 is a block diagram of electronic devices (e.g., the first electronic device 210, the second electronic device 220, and the sound source electronic device 230 in FIG. 2) according to certain embodiments.

Each of the first electronic device 210 or the second electronic device 220 may include a sensor module 310 or 320, a processor 311 or 321, a memory 312 or 322, a communication circuit 313 or 323, a microphone 314 or 324, a speaker 315 or 325, a power management circuit 316 or 326, and/or a battery 317 or 327.

The processor 311 or 321 may, for example, execute software (e.g., a program) to control at least another element (e.g., a hardware or software element) of the first electronic device 210 or the second electronic device 220 connected to the processor 311 or 321, and perform various data processing or calculation.

The memory 312 or 322 may store various data used by at least one element (e.g., the processor 311 or 321, or the sensor module 310 or 320) of the first electronic device electronic device 210 or the second electronic device 220. The data may include, for example, software (e.g., a program), and input data or output data related to a command related thereto. The memory 312 or 322 may include a volatile memory or a non-volatile memory.

The memory 312 or 322 may be combined with the processor 311 or 321 and/or the communication circuit 313 or 323.

As at least a part of the data processing or calculation, the processor 311 or 321 may load, in a volatile memory, a command or data received from another element (e.g., the sensor module 310 or 320 or the communication circuit 313 or 323), process the command or data loaded in the volatile memory, and store result data in a nonvolatile memory.

The communication circuit 313 or 323 may support establishment of a communication channel through a communication link (e.g., a first communication link 301, a second communication link 302, or a third communication link 303) between each of the first electronic device 210 or the second electronic device 220 and the sound source electronic device 230 and/or the other electronic device (e.g., the first electronic device 210 or the second electronic device 220), and/or execution of communication through the established communication channel.

The communication circuit 313 or 323 may include a wireless communication module (e.g., a cellular communication module, a short-range wireless communication module, or a global navigation satellite system (GNSS) communication module), or a wired communication module.

The communication circuit 313 or 323 may communicate with the sound source electronic device 230 through the first communication link 301 or the third communication link 303 (e.g., a short-range wireless communication network, such as Bluetooth, WiFi direct, or infrared data association (IrDA)).

The communication circuit 313 or 323 may communicate with the second electronic device 220 or the first electronic device 210 through the second communication link 302 (e.g., a short-range wireless communication network, such as Bluetooth, WiFi direct, or infrared data association (IrDA)).

The communication circuit 313 or 323 may include an antenna module. The antenna module of the communication circuit 313 or 323 may transmit a signal and/or power to the outside (e.g., the sound source electronic device 230) or may receive same from the outside. The antenna module of the communication circuit 313 or 323 may include one antenna including a radiator including a conductive pattern or a conductor disposed on a substrate (e.g., a PCB).

The antenna module may include multiple antennas. At least one antenna, among the multiple antennas, suitable for a communication scheme used in a wireless communication network, such as the first communication link 301, the second communication link 302, and/or the third communication link 303, may be selected by the communication circuit 313 or 323. A signal or power may be transmitted or received between the communication circuit 313 or 323 and an external electronic device (e.g., the sound source electronic device 230) via the selected at least one antenna. According to an embodiment, another component (e.g., an RFIC) other than the radiator may be additionally provided as a part of the antenna module.

The sensor module 310 or 320 may include an acceleration sensor 318 or 328 and a gyro sensor 319 and 329. The acceleration sensor 318 or 328 and/or the gyro sensor 319 and 329 may sense a movement and/or inertia of the first electronic device 210 or the second electronic device 220. The acceleration sensor 318 or 328 and/or the gyro sensor 319 and 329 may include a circuit (e.g., integrated circuit (IC)) for controlling the operation of the acceleration sensor 318 or 328 and/or the gyro sensor 319 and 329. For example, the circuit (e.g., integrated circuit (IC)) for controlling the operation of the acceleration sensor 318 or 328 and/or the gyro sensor 319 and 329 may be included in the first electronic device 210 or the second electronic device 220, and may be implemented by the processor 311 or 312.

The processor 311 or 321 may calculate a posture value, based on a sensor value obtained from the acceleration sensor 318 or 328 and/or the gyro sensor 319 and 329 of the sensor module 310 or 320. For example, the posture value may be expressed based on yaw, pitch, and roll values.

The speaker 315 or 325 may output an audio signal outside the first electronic device electronic device 210 or the second electronic device 220.

The microphone 314 or 324 may convert a sound obtained thereby into an electrical signal. The processor 311 or 321 may output, by using a sound, an electrical signal processed by the processor 311 or 312, based on audio data received from the sound source electronic device 230 wirelessly connected to the processor.

The power management circuit 316 or 326 may manage power supplied to the first electronic device 210 or the second electronic device 220. The power management circuit 316 or 326 may perform control such that manage the battery 317 or 327 can supply power required for each element of the first electronic device electronic device 210 or the second electronic device 220. The power management circuit 316 or 326 may control the state of charge of the battery 317 or 327.

The power management circuit 316 or 326 may charge the battery 317 or 327 by using power supplied from an external power source.

The power management circuit 316 or 326 may select a charging scheme (e.g., normal charging or quick charging), based on at least some of the type (e.g., a power adapter, a USB, or wireless charging) of the external power source, the magnitude of power suppliable from the external power source, and/or an attribute of the battery 317 or 327, and may charge the battery 317 or 327 by using the selected charging scheme. The external power source may be connected to the first electronic device 210 or the second electronic device 220, for example, by wire through a connector pin, or wirelessly via an antenna included in the communication circuit 313 or 323.

The power management circuit 316 or 326 may determine state-of-charge information (e.g., life time, overvoltage, low voltage, overcurrent, overcharge, over-discharge, overheat, short circuit, or swelling) related to charging of the battery 317 or 327, and control a charging operation for the battery 317 or 327, based on the determined state-of-charge information.

The processor 311 or 321 may identify a residual power level (battery residual capacity level) of the battery 317 or 327 via the power management circuit 316 or 326.

The battery 317 and 327 may supply power to at least one element of the first electronic device 210 or the second electronic device 220. The battery 317 or 327 may include, for example, a non-rechargeable primary battery, a rechargeable secondary battery, and/or a fuel battery.

The sound source electronic device 230 may be a portable and/or movable electronic device, such as a smartphone, a tablet PC, a portable multimedia player (PMP), a personal digital assistant (PDA), a laptop PC, and a wearable device.

The sound source electronic device 230 may be an electronic device capable of reproducing music or an image, and may provide relevant audio data to the first electronic device 210 and/or the second electronic device 220. The sound source electronic device 230 may include elements identical or similar to at least some of the elements of the electronic device 101 illustrated in FIG. 1.

The sound source electronic device 230 may include a processor 331, a memory 332, a communication circuit 333, and a sensor module 330.

The processor 331 may, for example, execute software (e.g., a program) to control at least another element (e.g., a hardware or software element) of the sound source electronic device 230 connected to the processor 311 or 321, and perform various data processing or calculation.

The memory 332 may store various data used by at least one element (e.g., the processor 331 or the communication circuit 333) of the sound source electronic device 230. The data may include, for example, software (e.g., a program), and input data or output data related to a command related thereto. The memory 332 may include a volatile memory or a non-volatile memory.

The memory 332 may store instructions for executing a head tracking audio solution and/or a coordinate calculation app.

The memory 332 may be combined with the processor 331 and/or the communication circuit 333.

As at least a part of the data processing or calculation, the processor 331 may load, in a volatile memory, a command or data received from another element (e.g., the memory 332 or the communication circuit 323), process the command or data loaded in the volatile memory, and store result data in a nonvolatile memory.

The communication circuit 333 may support establishment of a communication channel through a communication link (e.g., the first communication link 301 or the third communication link 303) between the sound source electronic device 230 and the first electronic device 210 or the second electronic device 220, and/or execution of communication through the established communication channel.

The communication circuit 333 may include a wireless communication module (e.g., a cellular communication module, a short-range wireless communication module, or a global navigation satellite system (GNSS) communication module), or a wired communication module.

The communication circuit 333 may communicate with the first electronic device 210 or the second electronic device 220 through the first communication link 301 or the third communication link 303 (e.g., a short-range wireless communication network, such as Bluetooth, WiFi direct, or infrared data association (IrDA)).

The processor 331 may render audio data, based on a posture value received from the first electronic device electronic device 210 or the second electronic device 220 through the first communication link 301 or the third communication link 303, and may transmit the rendered audio data to the first electronic device 210 or the second electronic device 220 through the first communication link 301 or the third communication link 303.

The processor 331 may load the instructions for executing a coordinate calculation app, which are stored in the memory 332, to execute the coordinate calculation app, and may estimate a posture value of a user's head (e.g., the head of a user wearing the first electronic device 210 and/or the second electronic device 220), based on a posture value received from the first electronic device 210 or the second electronic device 220.

The posture value received from the first electronic device electronic device 210 or the second electronic device 220 may be expressed based on yaw, pitch, and roll values. The posture value received from the first electronic device 210 or the second electronic device 220 may indicate posture information of the first electronic device 210 or the second electronic device 220 inserted in a user's ear.

Figure 4:
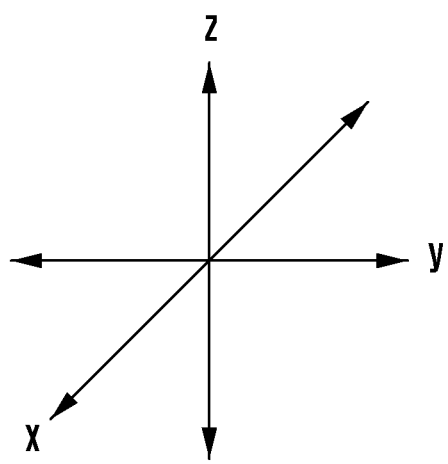
FIG. 4 is a diagram illustrating a posture value calculation operation according to certain embodiments.
Figure 4:
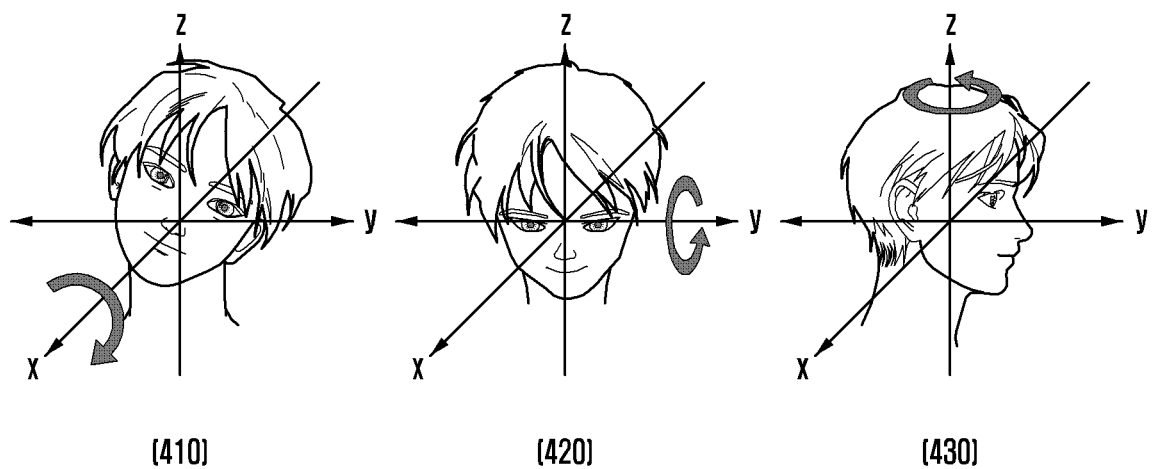

FIG. 4 is a diagram illustrating a posture value calculation operation according to certain embodiments.

Referring to FIG. 4, the posture value may be expressed by an azimuth change amount, for example, yaw, pitch, and roll values. Roll 410 may be a value expressing a rotation amount by which a user's head rotates about x-axis, pitch 420 may be a value expressing a rotation amount by which a user's head rotates about y-axis, and yaw 430 may be a value expressing a rotation amount by which a user's head rotates about z-axis.

The processor 331 may execute a coordinate calculation app, and calculate a posture value indicating posture information reflecting a user's head movement through, for example, conversion of a coordinate system with respect to a posture value which may correspond to a posture caused by a movement of the first electronic device 210 or the second electronic device 220. By using Euler angles, rotation matrices, or the quaternion scheme, a posture value of the first electronic device 210 or the second electronic device 220 may be indicated, and a posture value of a user's head may be calculated through conversion of a coordinate system. Hereinafter, a posture value calculation operation will be described according to a coordinate system conversion scheme employing the quaternion scheme, but the disclosure is not limited thereto.

According to the quaternion scheme, a rotation amount for conversion from an A coordinate system to a B coordinate system (or the A coordinate system expressed based on the B coordinate system) may be expressed by a quaternion formula as in Equation 1.

$$q_A^B = (w, i, j, k) \qquad \text{[Equation 1]}$$

According to certain embodiments, when audio rendering is performed, the processor 331 may perform audio rendering, based on a user's head movement, or render same, based on both a user's head movement and a movement of the sound source electronic device 230.

According to an embodiment, when the processor 331 performs audio rendering, based on a user's head movement, the processor may calculate a posture value $q_H^N$ of a user's head expressed in an Earth local coordinate system (navigation frame) employing the quaternion scheme. While the first electronic device 210 and/or the second electronic device 220 is worn, the first electronic device 210 and/or the second electronic device 220 are moved together with a user's head, and thus a relative posture value may be a constant value. The relative posture value is a value determined according to a mechanical characteristic of the first electronic device 210 and/or the second electronic device 220, may be a relative posture value $q_H^E$ determined through previous measurement based on a normal wearing state, and may be stored in the measurement 332 in advance.

The processor 331 may perform a calculation by applying a relative posture value, which is a constant value determined according to a relative posture based on a user's head and a wearing state of the first electronic device 210 and/or the second electronic device 220, to a posture value $q_E^N$ (a posture value of the first electronic device 210 and/or the second electronic device 220 expressed in the Earth local coordinate system) transmitted from the first electronic device 210 and/or the second electronic device 220. The processor 331 may calculate a user's head posture value $q_H^N$ (a user's head posture head expressed in the Earth local coordinate system) according to quaternion equation 2 as below by using a posture value $q_E^N$ of the first electronic device 210 and/or the second electronic device 220 expressed in the Earth local coordinate system, and a relative posture value $q_H^E$ stored in the memory 332.

$$q_H^N = q_E^N \cdot q_H^E \qquad \text{[Equation 2]}$$

According to another embodiment, when the processor 331 performs audio rendering, based on a user's head movement and a movement of the sound source electronic device 230, the processor may calculate a posture value $q_H^S$ of a user's head expressed in a coordinate system for the sound source electronic device 230, which employs the quaternion scheme. In this case, even when a user's head moves, a sound image may be changed, and even when the sound source electronic device 230 moves, a sound image may be changed.

For example, the processor 331 may obtain a sensor value via an acceleration sensor and/or a gyro sensor of a sensor module (e.g., the sensor module 176 in FIG. 1) of the sound source electronic device 230, and may calculate a posture value $q_S^N$ (a posture value of the sound source electronic device 230 expressed in the Earth local coordinate system) of the sound source electronic device 230, based on the sensor value. The processor 331 may calculate a posture value $q_H^H$ of a user's head expressed in the coordinate system for the sound source electronic device 230 according to quaternion equation 3 as below by using a posture value $q_S^N$ of the sound source electronic device 230, a posture value $q_E^N$ of the first electronic device 210 or the second electronic device 220, and a relative posture constant value $q_H^E$ for deriving a user's head posture value $q_H^N$ therefrom. Here, $(q_S^N)^*$ corresponds to the conjugate of $q_S^N$. A conjugate is a quaternion rotating opposite to a quaternion, and for example, when $q_S^N$ is expressed by (w, i, j, k), $(q_S^N)^*$ may be expressed by (w, −i, −j, −k).

$$q_H^S = q_N^S \cdot q_E^N \cdot q_H^E = (q_S^N)^* \cdot q_E^N \cdot q_H^E \qquad \text{[Equation 3]}$$

The processor 331 may load the instructions for executing a head tracking audio solution, which are stored in the memory 332, and may perform rendering allowing adjustment of, for example, a balance between the left and the right so as to assign spaciousness to a sound to be reproduced, by using an estimated posture value. The processor 331 may allow rendered audio data to be output via the first electronic device 210 and/or the second electronic device 220 so as to provide sound spaciousness to a user, so that the user can experience what it's like to directly hear a sound from a sound source in a real space. A detailed description thereof will be given with reference to FIG. 5.

The sensor module 330 may include an acceleration sensor 338 and a gyro sensor 339. The acceleration sensor 338 and/or the gyro sensor 339 may sense a movement and/or inertia of the sound source electronic device 230. The acceleration sensor 338 and/or the gyro sensor 339 may include a circuit (e.g., integrated circuit (IC)) for controlling the operation of the acceleration sensor 338 and/or the gyro sensor 339. For example, the circuit (e.g., integrated circuit (IC)) for controlling the operation of the acceleration sensor 338 and/or the gyro sensor 339 may be included in the sound source electronic device 230, and may be implemented by the processor 331.

The processor 331 may calculate a posture value, based on a sensor value obtained from the acceleration sensor 338 and/or the gyro sensor 339 of the sensor module 330. For example, the posture value may be expressed based on yaw, pitch, and roll values.

The processor 331 may render audio data, based on a posture value received from the first electronic device 210 or the second electronic device 220 through the first communication link 301 or the third communication link 303, and a posture value calculated based on a sensor value obtained from the acceleration sensor 338 and/or the gyro sensor 339 of the sensor module 330, and may transmit the rendered audio data to the first electronic device 210 or the second electronic device 220 through the first communication link 301 or the third communication link 303.

As noted above, determining the posture value can be computationally intense, thereby consuming a large amount of power from the battery 317 or 327. This can result in more power usage by the electronic device 210 or 220 that performs the primary role, and an imbalance in remaining battery power over time. To increase the amount of time that the electronic devices 210 or 220 can be used, the first electronic device 210 and the second electronic device 220 can swap roles.

Figure 5:
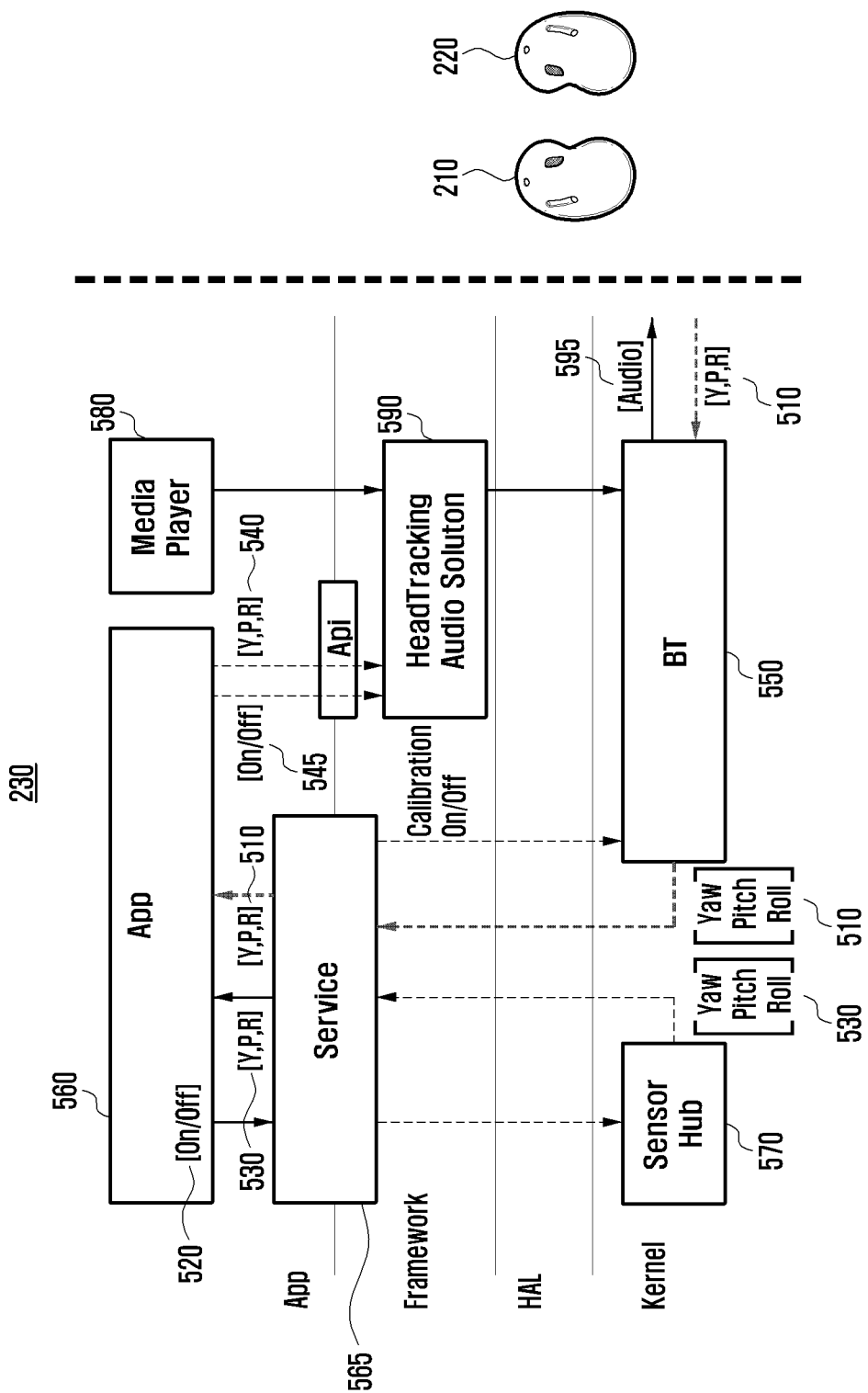
FIG. 5 is a diagram illustrating an audio rendering operation based on a posture value according to certain embodiments.

FIG. 5 is a diagram illustrating an audio rendering operation based on a posture value according to certain embodiments, and shows functional elements of a sound source electronic device (e.g., the sound source electronic device 230 in FIG. 2 or FIG. 3) and the flow of information.

Referring to FIG. 5, the sound source electronic device 230 may receive a first posture value 510 ($q_E^N$) from a first electronic device (e.g., the first electronic device electronic device 210 in FIG. 2 or FIG. 3) or a second electronic device (e.g., the second electronic device 220 in FIG. 2 or FIG. 3)

by using a Bluetooth communication module 550 (e.g., the communication circuit 333 in FIG. 3). The received posture value 510 may be transmitted to an application 560 via a service module 565.

A sensor module 570 (e.g., the sensor module 330 in FIG. 3) may generate a second posture value 530 ($q_S^N$) of the sound source electronic device 230, and the second posture value 530 generated in the sensor module 570 may be transmitted to the application 560 via the service module 565. The application 560 may be an application which provides, for example, a three-dimensional sound service.

The application 560 may generate and transmit a control signal 520 for the sensor module 570 to the service module 565. The service module 565 may control the sensor module 570, based on the control signal 520 received from the application 560.

Based on the first posture value 510 and the second posture value 530, the application 560 may generate, for example, a third posture value 540 ($q_H^N$), which is a user's head posture value, by using Equation 2, or generate a third posture value 540 ($q_H^S$), which is a user's head posture value based on a coordinate value of the sound source electronic device 230, by using Equation 3.

The application 560 may transmit the generated third posture value 540 to a three-dimensional sound module 590. The application 560 may transmit an activation control signal 545 to the three-dimensional sound module 590 so as to control activation of a three-dimensional sound service. The activated three-dimensional sound module 590 may render audio data received from a media reproduction module 580, based on the received third posture value 540, and transmit the rendered audio data to the Bluetooth communication module 550. The Bluetooth communication module 550 may transmit rendered audio data 595 to the first electronic device 210 or the second electronic device 220.

Figure 6A:
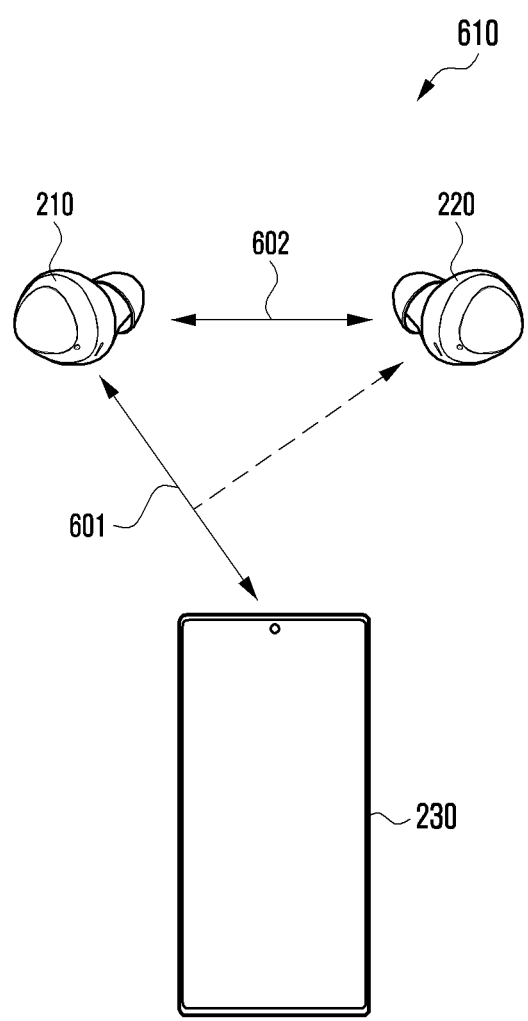
FIG. 6A and FIG. 6B are configuration diagrams of electronic devices and a sound source electronic device according to certain embodiments.
Figure 6B:
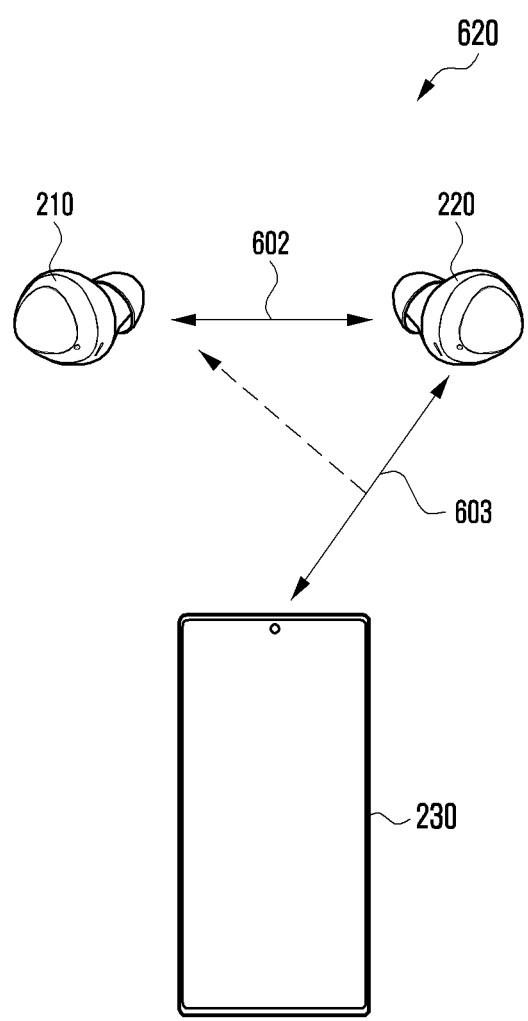

FIG. 6A and FIG. 6B are configuration diagrams of electronic devices (e.g., the first electronic device electronic device 210 and the second electronic device 220 in FIG. 2 or FIG. 3) and a sound source electronic device (e.g., the sound source electronic device 230 in FIG. 2 or FIG. 3) according to certain embodiments. In FIG. 6A, the first electronic device 210 is performs the primary role to transmit a posture value. In FIG. 6B, the second earbud 220 performs the primary role.

In FIG. 6A, When the first electronic device 210 performs the primary role, the first electronic device 210 compares remaining battery capacity thereof with the remaining battery capacity of second electronic device 220. If the remaining battery capacity of the second electronic device 220 exceeds the remaining battery capacity of the first electronic device 210, electronic device 210 and the second electronic device 220 exchange roles, such that earbud 220 performs the primary role as shown in FIG. 6B.

Referring to FIG. 6A and FIG. 6B, the first electronic device 210 and the second electronic device 220 may be worn on a user, and may include headphones, earphones, and/or earbuds capable of providing a sound to the user, based on audio data received from the sound source electronic device 230 by using a communication function. Hereinafter, an example in which the first electronic device 210 and the second electronic device 220 are implemented as earbuds, respectively, will be described, but certain embodiments may not be limited thereto.

The sound source electronic device 230 may be an portable and/or movable electronic device, such as a smartphone, a tablet PC, a portable multimedia player (PMP), a personal digital assistant (PDA), a laptop PC, and a wearable device.

The sound source electronic device 230 may be an electronic device capable of reproducing music or an image, and may provide relevant audio data to the first electronic device electronic device 210 and/or the second electronic device 220.

The first electronic device 210 may perform a primary role to establish communication with the sound source electronic device 230, and the second electronic device 220 may perform a secondary role to establish communication with the first electronic device electronic device 210, which is a primary device.

Referring to FIG. 6A, the first electronic device 210 may perform the primary role to be connected to the sound source electronic device 230 through a first communication link 601 by communication. For example, the first electronic device 210 may communicate with the sound source electronic device 230 through the first communication link 601 (e.g., the first network 198 in FIG. 1) including a short-range communication network, such as Bluetooth (or BLE), WiFi direct, or infrared data association (IrDA).

The first electronic device electronic device 210 may communicate with the second electronic device 220 by using a second communication link 602 (e.g., a short-range wireless communication network).

The first electronic device 210 may calculate a posture value, based on a sensor value obtained by an acceleration sensor (e.g., the acceleration sensor 318 in FIG. 3) and/or a gyro sensor (e.g., the gyro sensor 319 in FIG. 3) of a sensor module (e.g., the sensor module 310 in FIG. 3). For example, the posture value may be expressed based on yaw, pitch, and roll values.

The sound source electronic device 230 may render audio data, based on the posture value received from the first electronic device 210, and may transmit the rendered audio data to the first electronic device 210. A detailed description of the operation of calculating, by the sound source electronic device 230, a user's head posture value or a user's head posture value relative to a posture value of the sound source electronic device 230, based on a posture value received from the first electronic device 210, and rendering audio data, based on the calculated value has been given with reference to FIG. 3, and is omitted here.

The first electronic device electronic device 210 may communicate with the second electronic device 220 through the second communication link 602, and may allow the second electronic device 220 to perform sniffing for the first communication link 601 so as to obtain audio data received from the sound source electronic device 230. The first electronic device electronic device 210 may control the second electronic device 220 through the second communication link 602 such that the received audio data is output together.

The first electronic device 210 may identify a battery residual capacity (e.g., a residual power level) of a battery (e.g., the battery 317 in FIG. 3). For example, the first electronic device 210 may identify the battery residual capacity of the battery 317 via a power management circuit (e.g., the power management circuit 316 in FIG. 3).

The first electronic device 210 may receive battery residual capacity information of the second electronic device 220 through the second communication link 602 from the second electronic device 220.

The first electronic device 210 may determine primary/secondary role switching, based on device state information thereof. For example, the first electronic device 210 may determine primary/secondary role switching, based on a state of the battery 317 or a state of the sensor module 310.

The first electronic device 210 may determine primary/secondary role switching, based on device state information of the second earbud 220 in addition to device state information of the first electronic device. For example, the first electronic device 210 may determine primary/secondary role switching, based on a state of the battery 317 of the first electronic device and a state of the battery 327 of the second electronic device 220.

The first electronic device 210 may compare the battery residual capacity thereof and the battery residual capacity of the second electronic device 220, and when the difference therebetween is equal to or greater than a threshold value, determine primary/secondary role switching.

The first electronic device 210 may determine primary/secondary role switching when a sensor abnormality occurs in the acceleration sensor 318 and/or the gyro sensor 319 of the sensor module 310 thereof. For example, when a sensor value of the acceleration sensor 318 and/or the gyro sensor 319 is maintained for a predetermined time or longer, or is not output, the first electronic device 210 may identify that a sensor abnormality has occurred.

When role switching is determined, the first electronic device 210 may request, through the second communication link 602, the second electronic device 220 to perform a role switching preparation.

According to the requesting of, by the first electronic device 210, the role switching preparation, the second electronic device 220 may perform relevant operations for performing a primary role rather than a secondary role. For example, the second electronic device 220 may activate an acceleration sensor (e.g., the acceleration sensor 328 in FIG. 3) and/or a gyro sensor (e.g., the gyro sensor 329 in FIG. 3) of a sensor module (e.g., the sensor module 320 in FIG. 3) and obtain a sensor value. For example, the second electronic device 220 may calculate a posture value, based on a sensor value obtained via the sensor module 320.

The second electronic device 220 may start to perform the primary role after passage of a designated time from starting a posture value calculation operation, or when a role switching message is received from the first electronic device 210.

The first electronic device 210 may notify the sound source electronic device 230 that role switching is performed, after passage of a designated time, or when the second electronic device 220 performs role switching preparation. The first electronic device 210 may transmit a role switching message to the second electronic device 220 to perform role conversion, and may switch to the role of a secondary device.

Referring to FIG. 6B, the second electronic device 220 may, according to performing role switching, establish or connect a third communication link 603 (e.g., the first network 198 in FIG. 1) with the sound source electronic device 230 so as to perform communication. For example, the third communication link 603 may be switched from an idle state to a connected state, or may be newly established.

The second electronic device 220 may communicate with the sound source electronic device 230 through the third communication link 603 as a primary device, to transmit a calculated posture value, and receive audio data rendered based on the posture value from the sound source electronic device 230.

The sound source electronic device 230 may communicate with the second electronic device 220 through the third communication link 603, to receive a posture value of the second electronic device 220, and render audio data based on the posture value.

According to an embodiment, in a case where a processor (e.g., the processor 331 in FIG. 3) of the sound source electronic device 230 performs audio rendering, based on a posture value of the second electronic device 220 according to role switching while performing audio rendering, based on a posture value of the first electronic device 210, a posture value calculation scheme may be changed. For example, an equation for calculating a user's head posture value $q_H^N$, based on a posture value of a left unit or a right unit of earbuds may be calculated with reference to Equation 2, according to quaternion equation 4 as below by applying a relative posture value $q_H^L$ between the left unit and the user's head with respect to a left unit posture value $q_L^N$, or applying a relative posture value $q_H^R$ between the right unit and the user's head with respect to a right unit posture value $q_R^H$.

$$q_H^N = q_R^N \cdot q_H^R = q_L^N \cdot q_H^L \qquad \text{[Equation 4]}$$

The relative posture value $q_H^L$ between the left unit and the user's head, and the relative posture value $q_H^R$ between the right unit and the user's head is a value determined according to a mechanical characteristic of the first electronic device 210 and/or the second electronic device 220, and may be stored in advance in a memory (e.g., the memory 332 in FIG. 3) through previous measurement based on a normal wearing state.

Referring to Equation 4, according to primary role switching from the left unit to the right unit or from the right unit to the left unit, different relative posture values may be applied to calculate a user's head posture value. In this case, the left unit and the right unit start to measure posture values at different time points, and thus reference coordinates for calculating azimuths of the left unit and the right unit are different. Therefore, absolute azimuths thereof may not coincide with each other. Therefore, the processor 331 of the sound source electronic device 230 may perform operation as follows so that rendered sound images are not twisted and are smoothly connected even when the applied relative posture value is changed at a particular time point.

The processor 331 of the sound source electronic device 230 may, for example, when role switching between a left unit and a right unit of earbuds occurs, calculate a changed current posture value by calculating an azimuth change amount of the switched unit, and adding same to an output azimuth.

For example, when the azimuths of a user head estimated according to the postures of the left unit and the right unit are $Yaw_L$ and $Yaw_R$, respectively, the processor 331 may calculate $Yaw_{output}$, which is an azimuth value for audio rendering, according to Equation 5 as below.

$$Yaw_{output,0} = 0 \qquad \text{[Equation 5]}$$

$$Yaw_{output,t(>0)} = \begin{cases} Yaw_{output,t-1} + (Yaw_{L,t} - Yaw_{L,t-1}), & L: \text{primary} \\ Yaw_{output,t-1} + (Yaw_{R,t} - Yaw_{R,t-1}), & \text{otherwise} \end{cases}$$

Therefore, an azimuth output value reflects an azimuth change amount at a corresponding time point with respect to a previous azimuth output value rather than the azimuths estimated by the left and right units. Therefore, even when two different azimuths having different reference time points are used, an output value $Yaw_{output}$ may indicate a continuously accumulated azimuth change amount. Accordingly, when audio rendering is performed based on the output value, rendered sound images can be smoothly connected without being twisted in spite of role switching.

The first electronic device 210 may switch the first communication link 601 with the sound source electronic device 230 to be in an idle state, or may disconnect same. For example, the first electronic device 210 having switched to the role of a secondary device may switch the first communication link 201 with the sound source electronic device 230 to be in an idle state and/or a non-connected state.

The first electronic device 210 may communicate with the second electronic device 220 through the second communication link 602 as a secondary device, and perform sniffing for the third communication link 603 between the second electronic device 220 and the sound source electronic device 230 to obtain audio data transmitted from the sound source electronic device 230 to the second electronic device 220. For example, the first electronic device 210 may deactivate at least a part of the sensor module 310, or may switch same into a power save mode. For example, the first electronic device 210 may deactivate the gyro sensor 319, or may switch same into a power save mode.

According to another embodiment, when the first electronic device 210 obtains a sensor value and performs a posture value calculation operation based on the sensor value, the first electronic device may allow the second electronic device 220 to perform the posture value calculation operation via role switching with the second electronic device 220, and operate, in communication, as a primary device communicating with the sound source electronic device 230 while maintaining a state connected to the first communication link 601. For example, in a case where the battery residual capacity of the first electronic device 210 is high, but an abnormality of a sensor has occurred, the second electronic device 220 may be allowed to obtain a sensor value and perform a posture value calculation operation based on the sensor value.

An electronic device (e.g., the first electronic device 210 in FIG. 3) according to an embodiment may include a memory (e.g., the memory 312 in FIG. 3), a battery (e.g., the battery 317 in FIG. 3), a speaker (e.g., the speaker 315 in FIG. 3), a sensor module (e.g., the sensor module 310 in FIG. 3), a communication module (e.g., the communication circuit 313 in FIG. 3), and a processor (e.g., the processor 311 in FIG. 3) electrically connected to the memory 312, the battery 317, the speaker 315, the sensor module 310, and the communication module 313, wherein the processor 311 is configured to control the communication module 313 to establish a first communication link (e.g., the first communication link 201, 301, or 601 in FIG. 2, FIG. 3, or FIG. 6A) with a sound source electronic device (e.g., the sound source electronic device 230 in FIG. 3) and transmit a first posture value calculated based on a sensor value obtained from the sensor module 310 over the first communication link, receive audio data rendered based on the posture value from the sound source electronic device 230, communicate, based on device state information of the electronic device 210, with an external electronic device (e.g., the second electronic device 220 in FIG. 3) through a second communication link (e.g., the second communication link 202, 302, or 602 in FIG. 2, FIG. 3, FIG. 6A, or FIG. 6B) so as to request a role switching preparation, and transmit a role switching message to the external electronic device 220 and notify the sound source electronic device 230 of role switching with the external electronic device 220.

According to an embodiment, the processor 311 may be configured to receive battery residual capacity information of the external electronic device 220 through the second communication link 202, 302, or 602, and determine a difference between a residual capacity of the external electronic device with a residual capacity of the battery 317, and wherein request the role switching preparation is in response to the difference being greater than a designated threshold value.

According to an embodiment, the processor 311 may be configured to, when a designated time has passed after the requesting of the role switching preparation, transmit a role switching message to the external electronic device 220.

According to an embodiment, the processor 311 may be configured to receive a posture value from the external electronic device, monitor a change amount, and wherein transmit the role switching message comprises transmitting the role switching message when a difference between the change amount and a change amount of the posture value calculated by the processor 311 is equal to or smaller than a designated threshold value.

According to an embodiment, the processor 311 may be configured to, after notifying the sound source electronic device 230 of the role switching, control the communication module to release the first communication link 201, 301, or 601 with the sound source electronic device 230.

According to an embodiment, the processor 311 may be configured to, after notifying the sound source electronic device 230 of the role switching, control the communication module to at least partially deactivate the sensor module 313.

According to an embodiment, the processor 311 may be configured to, receive a second posture value from the external electronic device over the second communication link and transmit the second posture value received from the external electronic device 220 to the sound source electronic device 230 over the first communication link, and receive audio data rendered based on the posture value of the external electronic device 220.

According to an embodiment, the processor 311 may be configured to, after receiving a response to the request, the response indicating that role switching is possible from the external electronic device 220, transmit the role switching message to the external electronic device 220.

According to an embodiment, an electronic device (e.g., the sound source electronic device 230 in FIG. 2 or FIG. 3) may include a memory (e.g., the memory 332 in FIG. 3), a communication module (e.g., the communication module 333 in FIG. 3), and a processor (e.g., the processor 331 in FIG. 3) electrically connected to the memory 332 and the communication module 333, wherein the processor 331 is configured to control the communication module 333 to establish a first communication link (e.g., the first communication link 201, 301, or 601 in FIG. 2, FIG. 3, or FIG. 6A) with a first electronic device (e.g., the first electronic device 210 in FIG. 2 or FIG. 3) and receive a posture value of the first electronic device 210 that performs a primary role, transmit audio data rendered based on the posture value to the first electronic device 210, receive a posture value of a second electronic device 220 when role switching with the second electronic device 220 connected to the first electronic device 210 through a second communication link (e.g., the second communication link 202, 302, or 602 in FIG. 2, FIG. 3, FIG. 6A, or FIG. 6B) is notified of by the first electronic device 210, and transmit audio data rendered based on the posture value of the second electronic device 220 to at least one of the first electronic device 210 or the second electronic device 220.

The processor 331 may configured to render the audio data, based on a posture value output by accumulating and summing an azimuth change amount of the posture value of the second electronic device 220 with respect to an azimuth change amount of the posture value of the first electronic device 210, and transmit the rendered audio data to at least one of the first electronic device or the second electronic device.

According to an embodiment, each of the first electronic device 210 and the second electronic device 220 may include a left or right earbud, and the processor 331 may be configured to calculate a user's head posture value, based on a posture value of the left earbud or a posture value of the right earbud, and render the audio data, based on the user's head posture value.

The electronic device may further include a sensor module (e.g., the sensor module 330 in FIG. 3), wherein the processor 331 is configured to calculate a posture value of the electronic device 230 according to a sensor value received from the sensor module 330, and based on the posture value of the electronic device 230, convert the posture value received from the first electronic device 210 or the second electronic device 220 into a user's head posture value to render the audio data.

Figure 7:
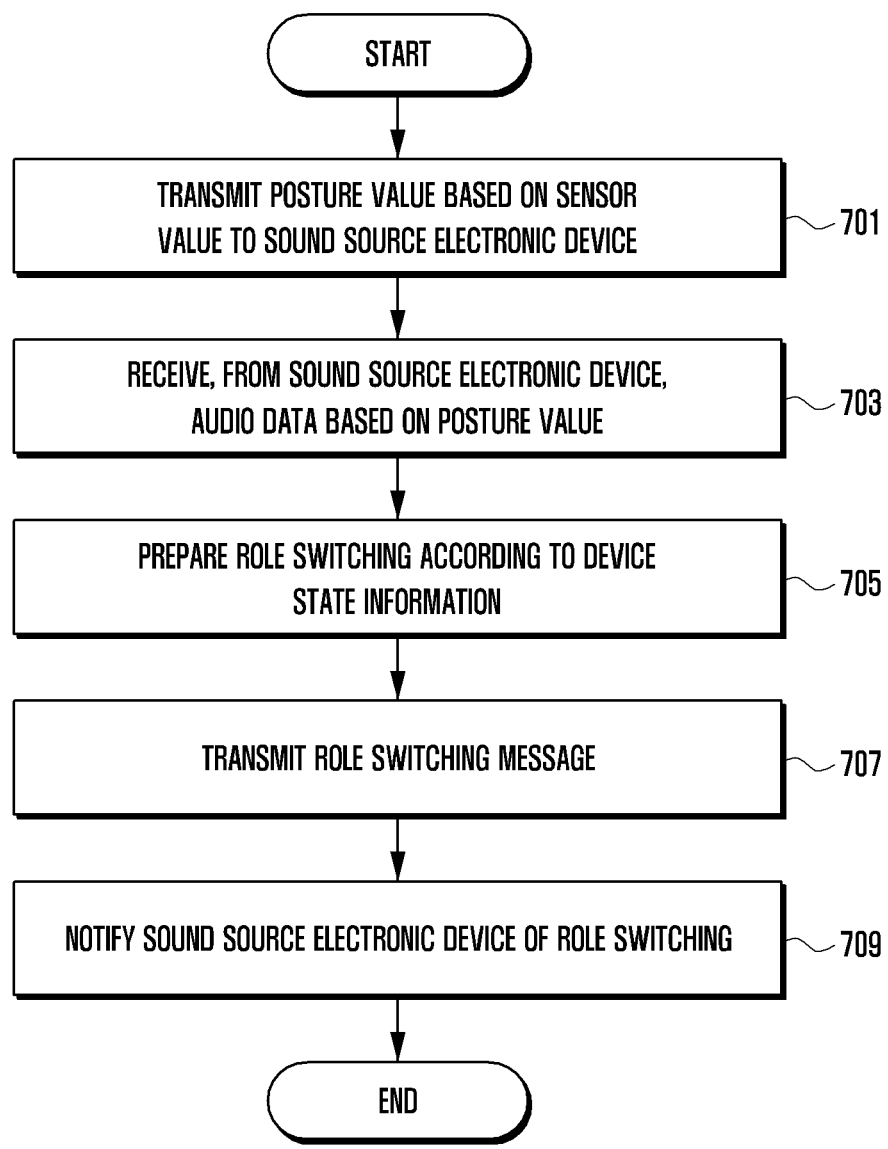
FIG. 7 is a flowchart illustrating a role switching method for a first electronic device according to certain embodiments.

FIG. 7 is a flowchart illustrating a role switching method for a first electronic device (e.g., the first electronic device 210 in FIG. 2 or FIG. 3) according to certain embodiments.

The first electronic device 210 and a second electronic device (e.g., the second electronic device 220 in FIG. 2 or FIG. 3) may be worn on a user, and may include headphones, earphones, and/or earbuds capable of providing a sound to the user, based on audio data received from a sound source electronic device (e.g., the sound source electronic device 230 in FIG. 2 or FIG. 3) by using a communication function. Hereinafter, an example in which the first electronic device 210 and the second electronic device 220 are implemented as earbuds, respectively, will be described, but certain embodiments may not be limited thereto.

The first electronic device 210 may operate as a primary device, the second electronic device 220 may operate as a secondary device, and when role switching is determined, the first electronic device 210 may switch to the role of a secondary device, and the second electronic device 220 may switch to the role of a primary device.

The sound source electronic device 230 may be an portable and/or movable electronic device, such as a smartphone, a tablet PC, a portable multimedia player (PMP), a personal digital assistant (PDA), a laptop PC, and a wearable device.

The sound source electronic device 230 may be an electronic device capable of reproducing music or an image, and may provide relevant audio data to the first electronic device 210 and/or the second electronic device 220.

According to an embodiment, a processor (e.g., the processor 311 in FIG. 3) of the first electronic device 210 may establish communication with the sound source electronic device 230 via a communication circuit (e.g., the communication circuit 313 in FIG. 3) so as to enable the first electronic device 201 to perform a primary role.

The processor 311 of the first electronic device 210 may, in operation 701, calculate a posture value of the first electronic device 210, based on a sensor value obtained via an acceleration sensor (e.g., the acceleration sensor 318 in FIG. 3) and/or a gyro sensor (e.g., the gyro sensor 319 in FIG. 3) of a sensor module (e.g., the sensor module 310 in FIG. 3), and transmit the calculated posture value to the sound source electronic device 230.

The first electronic device 210 may calculate the posture value, based on the sensor value obtained by the acceleration sensor 318 and/or the gyro sensor 319 of the sensor module 310. For example, the posture value may be expressed based on yaw, pitch, and roll values.

The first electronic device 210 may perform the primary role to transmit or receive a signal to or from the sound source electronic device 230 through a first communication link (e.g., the first communication link 201, 301, or 601 in FIG. 2, FIG. 3, or FIG. 6A). For example, the first communication link 201, 301, or 601 may include a short-range communication network, such as Bluetooth (or BLE), WiFi direct, or infrared data association (IrDA).

According to certain embodiments, in operation 703, the processor 311 of the first electronic device 210 may receive, from the sound source electronic device 230, audio data rendered based on the posture value received from the first electronic device 210.

The first electronic device 210 may communicate with the second electronic device 220 by using a second communication link (e.g., the second communication link 202, 302, or 602 in FIG. 2, FIG. 3, FIG. 6A, or FIG. 6B) (e.g., a short-range wireless communication network). For example, the second electronic device 220 may perform the secondary role to establish communication with the first electronic device 210, which is a primary device, through the second communication link 202, 302, or 302.

The processor 311 of the first electronic device 210 may communicate with the second electronic device 220 through the second communication link 602, and may allow the second electronic device 220 to sniff and obtain audio data received from the sound source electronic device 230. The first electronic device 210 may control the second electronic device 220 through the second communication link 202, 302, or 602 such that the received audio data is output together.

The processor 311 of the first electronic device 210 may, in operation 705, determine role switching according to device state information, and request the second electronic device 220 to perform a role switching preparation.

The processor 311 may determine the battery residual capacity of a battery (e.g., the battery 317 in FIG. 3), and determine role switching, based on same. For example, the processor 311 may determine role switching through a comparison between the battery residual capacity of the first electronic device 210 and the battery residual capacity of the second electronic device 220. For example, the processor 311 of the first electronic device 210 may identify the battery residual capacity of the battery 317 via a power management processor circuit (e.g., the power management circuit 316 in FIG. 3). For example, the processor 311 of the first electronic device 210 may receive battery residual capacity information of the second electronic device 220 through the second communication link 202, 302, 602 from the second electronic device 220. The processor 311 of the first electronic device 210 may compare the battery residual capacity thereof and the battery residual capacity of the second electronic device 220, and when the difference therebetween is equal to or greater than a threshold value, determine primary/secondary role switching.

The processor 311 of the first electronic device 210 may determine primary/secondary role switching when a sensor abnormality occurs in the acceleration sensor 318 and/or the gyro sensor 319 of the sensor module 310 thereof. For example, when a sensor value of the acceleration sensor 318 and/or the gyro sensor 319 is maintained for a predetermined time or longer, or is not output, the processor 311 may identify that a sensor abnormality has occurred.

According to an embodiment, when role switching is determined, the processor 311 of the first electronic device 210 may request, through the second communication link 202, 302, or 602, the second electronic device 220 to perform a role switching preparation.

According to certain embodiments, in order for the second electronic device 220 to perform relevant operations for the primary role according to the role switching preparation request, the processor (e.g., the processor 321 in FIG. 3) may activate an acceleration sensor (e.g., the acceleration sensor 328 in FIG. 3) and/or a gyro sensor (e.g., the gyro sensor 329 in FIG. 3) of a sensor module (e.g., the sensor module 320 in FIG. 3) and obtain a sensor value. The processor 321 of the second electronic device 220 may calculate a posture value, based on a sensor value obtained via the sensor module 320.

The processor 311 of the first electronic device 210 may, in operation 707, transmit a role switching message to the second electronic device 220.

The processor 311 of the first electronic device 210 may transmit the role switching message to the second electronic device 220 after passage of a designated time so as to allow the role switching so that the processor 321 of the second electronic device 220 can be stabilized through initiation of operation of the sensor module 320 and a subsequent posture value calculation according to the role switching preparation request.

According to an embodiment, the processor 311 of the first electronic device 210 may receive a posture value calculated by the second electronic device 220 according to the role switching preparation request, and the first electronic device 210 may, based on the posture value, monitor change amounts of the posture value of the first electronic device 210 and the posture value of the second electronic device 220, and when the difference between the change amounts is smaller than a threshold value, determine that role switching is possible, and transmit a role switching message to the second electronic device 220.

According to an embodiment, the processor 321 of the second electronic device 220 may receive a posture value of the first electronic device 210 from the first electronic device 210 according to initiation of operation of the sensor module 320 and a subsequent posture value calculation, and monitor change amounts of the posture value of the first electronic device 210 and the posture value of the second electronic device 220. When the difference between the change amounts is smaller than a threshold value, transmit, to the first electronic device 210, the processor of the second electronic device may transmit a response indicating that role switching is possible, and the processor 331 of the first electronic device 210 may transmit a role switching message to the second electronic device 220, based on the response.

The processor 311 of the first electronic device 210 may allow the second electronic device 220 to transmit, to the sound source electronic device 230, a posture value calculated according to initiation of operation of the sensor module 320 and a subsequent posture value calculation, and the sound source electronic device 230 may monitor change amounts of the posture value of the first electronic device 210 and the posture value of the second electronic device 220, and when the difference between the change amounts is smaller than a threshold value, determine that role switching is possible, and allow transmission of a role switching message to the first electronic device 210 and/or the second electronic device 220.

According to certain embodiments, when a response to the role switching request is received from the second electronic device 220, the processor 311 of the first electronic device 210 may, in operation 709, notify the sound source electronic device 230 that role switching is performed. According to an embodiment, the processor 311 of the first electronic device 210 may control the second electronic device 220 to perform role switching to a primary device by, for example, transmitting a control signal.

The second electronic device 220 may, according to performing role switching, establish or connect a third communication link (e.g., the third communication link 203, 303, or 603 in FIG. 2, FIG. 3, or FIG. 6b) (e.g., the first network 198 in FIG. 1) with the sound source electronic device 230 so as to perform communication. For example, the third communication link 203, 303, or 603 may be switched from an idle state to a connected state, or may be newly established.

The second electronic device 220 may communicate with the sound source electronic device 230 through the third communication link 603 as a primary device, to transmit a calculated posture value, and receive audio data rendered based on the posture value from the sound source electronic device 230.

The processor 311 of the first electronic device 210 may switch the first communication link 201, 301, or 601 with the sound source electronic device 230 to be in an idle state, or may disconnect same. For example, the first electronic device 210 having switched to the role of a secondary device may switch the first communication link 201 with the sound source electronic device 230 to be in an idle state and/or a non-connected state.

The processor 311 of the first electronic device 210 may communicate with the second electronic device 220 through the second communication link 602 as a secondary device, and perform sniffing for the third communication link 203, 303, or 603 between the second electronic device 220 and the sound source electronic device 230 to obtain audio data transmitted from the sound source electronic device 230 to the second electronic device 220.

The processor 311 of the first electronic device 210 may deactivate at least a part of the sensor module 310, or may switch same into a power save mode. For example, the first electronic device 210 may deactivate the gyro sensor 319, or may switch same into a power save mode.

Figure 8:
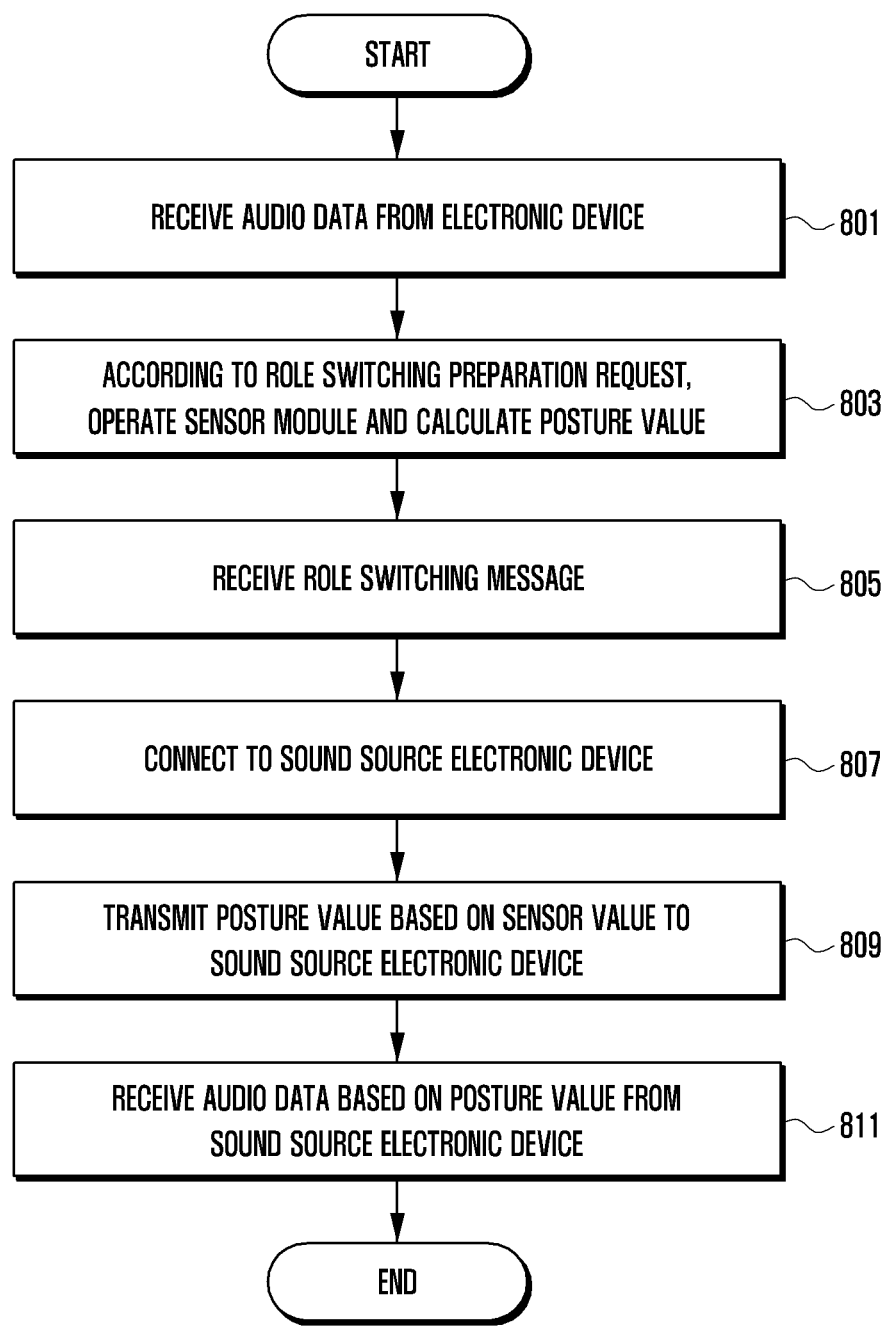
FIG. 8 is a flowchart illustrating a role switching method for a second electronic device according to certain embodiments.

FIG. 8 is a flowchart illustrating a role switching method for a second electronic device (e.g., the second electronic device 220 in FIG. 2 or FIG. 3) of electronic devices according to certain embodiments.

According to certain embodiments, a first electronic device (e.g., the first electronic device 210 in FIG. 2 or FIG. 3) and the second electronic device 220 may be worn on a user, and may include headphones, earphones, and/or earbuds capable of providing a sound to the user, based on audio data received from a sound source electronic device (e.g., the sound source electronic device 230 in FIG. 1 or FIG. 3) by using a communication function. Hereinafter, an example in which the first electronic device 210 and the second electronic device 220 are implemented as earbuds, respectively, will be described, but certain embodiments may not be limited thereto.

The first electronic device 210 may operate as a primary device, the second electronic device 220 may operate as a secondary device, and when role switching is determined, the first electronic device 210 may switch to the role of a secondary device, and the second electronic device 220 may switch to the role of a primary device.

The sound source electronic device 230 may be an portable and/or movable electronic device, such as a smartphone, a tablet PC, a portable multimedia player (PMP), a personal digital assistant (PDA), a laptop PC, and a wearable device.

The sound source electronic device 230 may be an electronic device capable of reproducing music or an image, and may provide relevant audio data to the first electronic device 210 and/or the second electronic device 220.

According to an embodiment, a processor (e.g., the processor 321 in FIG. 3) of the second electronic device 220 may communicate, via a communication circuit (e.g., the communication circuit 323 in FIG. 3), with the first electronic device 210 which establishes communication with the sound source electronic device 230 and communicates with same. For example, the processor 321 of the second electronic device 220 may communicate with the first electronic device 210 through a second communication link (e.g., the second communication link 202, 302, or 602 in FIG. 2, FIG. 3, FIG. 6A or FIG. 6B), and sniff and obtain audio data received by the first electronic device 210 through a first communication link (e.g., the first communication link 201, 301, or 601 in FIG. 2, FIG. 3, or FIG. 6A) from the sound source electronic device 230.

The processor 321 of the second electronic device 220 may, in operation 801, receive, for example, through sniffing, audio data transmitted from the sound source electronic device 230 to the first electronic device 210. The processor 321 of the second electronic device 220 may output the received audio data together under a control of the first electronic device 210.

According to certain embodiments, in operation 803, the processor 321 of the second electronic device 220 may activate, according to reception of a role switching preparation request from the first electronic device 210, an acceleration sensor (e.g., the acceleration sensor 328 in FIG. 3) and/or a gyro sensor (e.g., the gyro sensor 329 in FIG. 3) of a sensor module (e.g., the sensor module 320 in FIG. 3), obtain a sensor value, and calculate a posture value of the second electronic device 220, based on the sensor value.

The processor 321 of the second electronic device 220 may, in operation 805, receive a role switching message according to initiation of operation of the sensor module 320 and a subsequent posture value calculation. For example, the processor 321 of the second electronic device 220 may transmit, to the first electronic device 210, a posture value calculated according to initiation of operation of the sensor module 320 and a subsequent posture value calculation, and the first electronic device 210 may monitor, based on the posture value, change amounts of the posture value of the first electronic device 210 and the posture value of the second electronic device 220, and when the difference between the change amounts is smaller than a threshold value, determine that role switching is possible, and transmit a role switching message to the second electronic device 220. For example, the processor 321 of the second electronic device 220 may a response indicating that role switching is possible, to the first electronic device 210, according to initiation of operation of the sensor module 320 and a subsequent posture value calculation, and the first electronic device 210 may transmit, based on the response, a role switching message to the second electronic device 220.

According to another embodiment, the processor 321 of the second electronic device 220 may transmit, to the sound source electronic device 230, a posture value calculated according to initiation of operation of the sensor module 320 and a subsequent posture value calculation, and the sound source electronic device 230 may monitor change amounts of the posture value of the first electronic device 210 and the posture value of the second electronic device 220, and when the difference between the change amounts is smaller than a threshold value, determine that role switching is possible, and transmit a role switching message to the second electronic device 220 and/or the first electronic device 210.

According to various embodiments, the processor 321 of the first electronic device 210 may, in operation 807, establish communication with the sound source electronic device 230 as a primary device. For example, the processor 321 of the second electronic device 220 may, according to performing role switching, establish or connect a third communication link (e.g., the third communication link 203, 303, or 603 in FIG. 2, FIG. 3, or FIG. 6B) (e.g., the first network 198 in FIG. 1) with the sound source electronic device 230 so as to perform communication. For example, the third communication link 203, 303, or 603 may be switched from an idle state to a connected state, or may be newly established.

The processor 321 of the second electronic device 220 may, in operation 809, communicate with the sound source electronic device 230 through the third communication link 603, to transmit a calculated posture value thereto, and may, in operation 811, receive audio data rendered based on the posture value from the sound source electronic device 230.

The audio data received from the sound source electronic device 230 may be audio data, which is rendered based on the posture value of the second electronic device 220, and to which an azimuth output by accumulating azimuth change amounts, as described with reference to Equation 5, with respect to the posture value of the first electronic device 210 before role switching.

The first electronic device 210 may, according to switching to the role of a secondary device, switch the first communication link 201, 301, or 601 with the sound source electronic device 230 to be in an idle state, or disconnect same. For example, the first electronic device 210 having switched to the role of a secondary device may switch the first communication link 201 with the sound source electronic device 230 to be in an idle state and/or a non-connected state.

The first electronic device 210 may communicate with the second electronic device 220 through the second communication link 602 as a secondary device, and perform sniffing for the third communication link 203, 303, or 603 between the second electronic device 220 and the sound source electronic device 230 to obtain audio data transmitted from the sound source electronic device 230 to the second electronic device 220.

According to an embodiment, when the first electronic device 210 obtains a sensor value and performs a posture value calculation operation based on the sensor value, the first electronic device may allow the second electronic device 220 to perform the posture value calculation operation via role switching with the second electronic device 220, and operate, in communication, as a primary device communicating with the sound source electronic device 230 while maintaining a state connected to the first communication link 201, 301, or 601. For example, in a case where the battery residual capacity of the first electronic device 210 is high, but an abnormality of a sensor has occurred, the second electronic device 220 may be allowed to obtain a sensor value and perform a posture value calculation operation based on the sensor value.

According to certain embodiments, a method for an electronic device comprising a sensor module, comprises: establishing a first communication link with a sound source electronic device and transmitting to the sound source electronic device, a first posture value calculated based on a sensor value obtained from the sensor module; receiving audio data rendered based on the posture value from the sound source electronic device; communicating, based on device state information, with an external electronic device, through a second communication link so as to request a role switching preparation; transmitting a role switching message to the external electronic device; notifying the sound source electronic device of role switching with the external electronic device; and transmitting the first posture value to the external electronic device after role switching.

According to certain embodiments, the method further comprises receiving battery residual capacity information of the external electronic device through the second communication link; and determine a difference between the residual capacity of the external electronic device with a residual capacity of a battery of the electronic device, and wherein the request for the role switching preparation is in response to the difference being equal to or greater than a designated threshold value.

According to certain embodiments, transmitting of the role switching message to the external electronic device is performed is performed when a designated time after the requesting of the role switching preparation has passed.

According to certain embodiments, the method further comprises receiving a posture value from the external electronic device, and monitoring a change amount, and wherein transmitting the role switching message comprises transmitting the role switching message and when a difference between the change amount of the posture value of the external electronic device and a change amount of the posture value of the electronic device is equal to or smaller than a designated threshold value.

According to certain embodiments, after the notifying of the role switching, releasing the first communication link with the sound source electronic device.

According to certain embodiments, the method further comprises, after the notifying of the role switching, at least partially deactivating the sensor module.

According to certain embodiments, the method further comprises: receive a second posture value from the external electronic device over the second communication link and, transmitting the second posture value received from the external electronic device to the sound source electronic device over the first communication link; and receiving, from the sound source electronic device, audio data rendered based on the posture value of the external electronic device.

According to certain embodiments, transmitting the role switching message is performed when a response indicating that role switching is possible is received from the external electronic device according to initiation of a posture value calculation operation.

The embodiments disclosed herein are merely presented to easily describe technical content and help the understanding of same and are not intended to limit the technical scope disclosed therein. Therefore, the technical scope disclosed therein should be construed to include, in addition to the embodiments disclosed herein, all changes and modifications that are derived based on the technical idea of certain embodiments disclosed herein.

The invention claimed is:

1. An electronic device comprising:
a battery;
a speaker;
a sensor module;
a communication module; and
a processor electrically connected to the battery, the speaker, the sensor module, and the communication module;
memory storing instructions being executable by the processor, cause the electronic device to:
control the communication module to establish a first communication link with a sound source electronic device and transmit a first posture value calculated based on a sensor value obtained from the sensor module over the first communication link, the first posture value indicating an orientation of a user's head,
receive audio data rendered based on the first posture value from the sound source electronic device,
communicate, based on device state information of the electronic device, with an external electronic device through a second communication link so as to request a role switching preparation, and
transmit a role switching message to the external electronic device and notify the sound source electronic device of role switching with the external electronic device.

2. The electronic device of claim 1, wherein the instructions being executable by the processor, cause the electronic device to:
receive battery residual capacity information of the external electronic device through the second communication link, and
determine a difference between a residual capacity of the external electronic device with a residual capacity of the battery, and
wherein request the role switching preparation is in response to the difference being greater than a designated threshold value.

3. The electronic device of claim 1, wherein the instructions being executable by the processor, cause the electronic device to, when a designated time has passed after the requesting of the role switching preparation, transmit a role switching message to the external electronic device.

4. The electronic device of claim 1, wherein the instructions being executable by the processor, cause the electronic device to receive a posture value from the external electronic device, monitor a change amount, and wherein transmit the role switching message comprises transmitting the role switching message when a difference between the change amount and a change amount of the posture value calculated by the processor is equal to or smaller than a designated threshold value.

5. The electronic device of claim 1, wherein the instructions being executable by the processor, cause the electronic device to, after notifying the sound source electronic device of the role switching, control the communication module to release the first communication link with the sound source electronic device.

6. The electronic device of claim 1, wherein the instructions being executable by the processor, cause the electronic device to, after notifying the sound source electronic device of the role switching, at least partially deactivate the sensor module.

7. The electronic device of claim 1, wherein the instructions being executable by the processor, cause the electronic device to, receive a second posture value from the external electronic device over the second communication link and transmit the second posture value received from the external electronic device to the sound source electronic device over the first communication link, and receive audio data rendered based on the first posture value of the external electronic device.

8. The electronic device of claim 1, wherein the instructions being executable by the processor, cause the electronic device to, after receiving a response to the request, the response indicating that role switching is possible from the external electronic device, transmit the role switching message to the external electronic device.

9. A method for an electronic device comprising a sensor module, the method comprising:
 establishing a first communication link with a sound source electronic device and transmitting to the sound source electronic device, a first posture value calculated based on a sensor value obtained from the sensor module, the first posture value indicating an orientation of a user's head;
 receiving audio data rendered based on the first posture value from the sound source electronic device;
 communicating, based on device state information, with an external electronic device, through a second communication link so as to request a role switching preparation;
 transmitting a role switching message to the external electronic device; and
 notifying the sound source electronic device of role switching with the external electronic device.

10. The method of claim 9, further comprising:
 receiving battery residual capacity information of the external electronic device through the second communication link; and
 determine a difference between the residual capacity of the external electronic device with a residual capacity of a battery of the electronic device, and
 wherein the request for the role switching preparation is in response to the difference being equal to or greater than a designated threshold value.

11. The method of claim 9, wherein, transmitting of the role switching message to the external electronic device is performed is performed when a designated time after the requesting of the role switching preparation has passed.

12. The method of claim 9, further comprising receiving a posture value from the external electronic device, and monitoring a change amount, and wherein transmitting the role switching message comprises transmitting the role switching message when a difference between the change amount of the posture value of the external electronic device and a change amount of the posture value of the electronic device is equal to or smaller than a designated threshold value.

13. The method of claim 9, further comprising, after the notifying of the role switching, releasing the first communication link with the sound source electronic device.

14. The method of claim 9, further comprising, after the notifying of the role switching, at least partially deactivating the sensor module.

15. The method of claim 9, further comprising:
 receive a second posture value from the external electronic device over the second communication link and, transmitting the second posture value received from the external electronic device to the sound source electronic device over the first communication link; and
 receiving, from the sound source electronic device, audio data rendered based on the first posture value of the external electronic device.

16. The method of claim 9, wherein, transmitting the role switching message is performed when a response indicating that role switching is possible is received from the external electronic device according to initiation of a posture value calculation operation.

17. An electronic device comprising:
 a communication module;
 a processor electrically connected to the communication module; and
 memory storing instructions being executable by the processor, cause the electronic device to:
 control the communication module to establish a first communication link with a first electronic device and receive a posture value of the first electronic device that performs a primary role, the posture value indicating an orientation of a user's head,
 transmit audio data rendered based on the posture value to the first electronic device,
 receive a posture value of a second electronic device after receiving notification of role switching from the first electronic device, and
 transmit audio data rendered based on the posture value from the second electronic device to at least one of the first electronic device or the second electronic device.

18. The electronic device of claim 17, wherein the instructions being executable by the processor, cause the electronic device to render the audio data, based on a posture value output by accumulating and summing an azimuth change amount of the posture value of the second electronic device with respect to an azimuth change amount of the posture value of the first electronic device, and transmit the rendered audio data to at least one of the first electronic device or the second electronic device.

19. The electronic device of claim 17, wherein each of the first electronic device and the second electronic device comprises a left or right earbud, and
 wherein the instructions being executable by the processor, cause the electronic device to calculate a user's head posture value, based on a posture value of the left earbud or a posture value of the right earbud, and render the audio data, based on the user's head posture value.

20. The electronic device of claim 17, further comprising a sensor module,
 wherein the instructions being executable by the processor, cause the electronic device to calculate a posture value of the electronic device according to a sensor value received from the sensor module, and
 based on the posture value of the electronic device, convert the posture value received from the first electronic device or the second electronic device into a user's head posture value to render the audio data.

* * * * *